United States Patent [19]

McIlwain

[11] 4,296,592
[45] Oct. 27, 1981

[54] AUGER FLOATATION LIMIT

[75] Inventor: Irwin D. McIlwain, Lancaster, Pa.

[73] Assignee: Sperry Corporation, New Holland, Pa.

[21] Appl. No.: 203,084

[22] Filed: Nov. 3, 1980

[51] Int. Cl.³ .............................................. A01D 41/12
[52] U.S. Cl. ...................................... 56/14.4; 198/511
[58] Field of Search ................ 56/14.4, 208, DIG. 15; 198/511, 518

[56] References Cited

U.S. PATENT DOCUMENTS

| | | | |
|---|---|---|---|
| 2,696,290 | 12/1954 | Carroll | 198/720 |
| 2,822,656 | 2/1958 | Rogers | 56/208 |
| 3,324,639 | 6/1967 | Halls et al. | 56/14.4 |
| 3,698,171 | 10/1972 | Hecht | 56/DIG. 15 |
| 3,854,572 | 12/1974 | Maiste | 198/511 |

Primary Examiner—Paul J. Hirsch
Attorney, Agent, or Firm—Larry W. Miller; Frank A. Seemar; James R. Bell

[57] ABSTRACT

An auger flotation limit for a crop harvesting header on which a floating auger is utilized is disclosed wherein a lower stop, defining the lower limit of movement of the auger, is connected to the upper stop, defining the upper limit of auger movement, by a strap mechanism. An adjusting mechanism operatively engages the lower stop for selectively adjusting the positional relationship between the auger and the floor of the header. The strap mechanism interconnecting the upper and lower stops permits the lower stop to be selectively adjusted without effecting the amount of flotational movement permitted to the auger. A fore-and-aft adjustment mechanism is also provided to permit the auger to be selectively adjusted in a fore-and-aft direction relative to the rear wall of the header.

6 Claims, 5 Drawing Figures

U.S. Patent  Oct. 27, 1981  Sheet 1 of 2  4,296,592
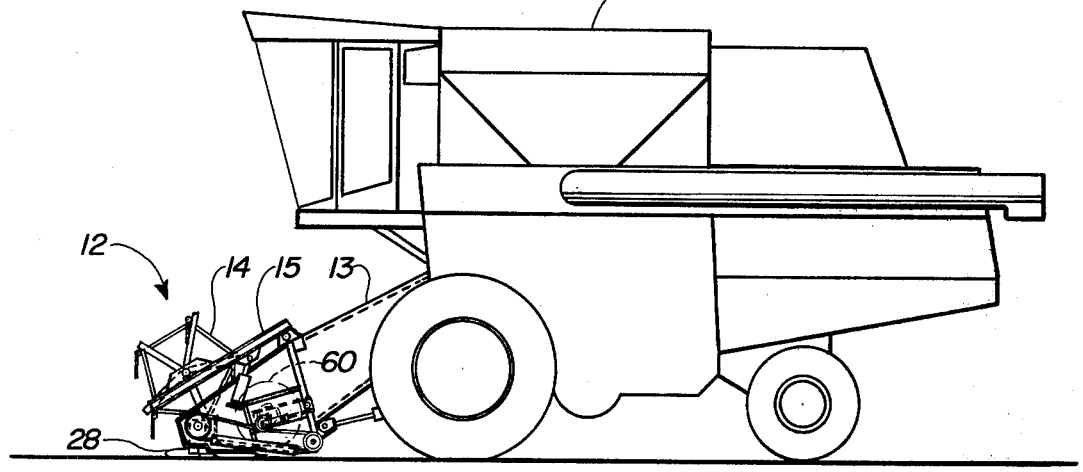
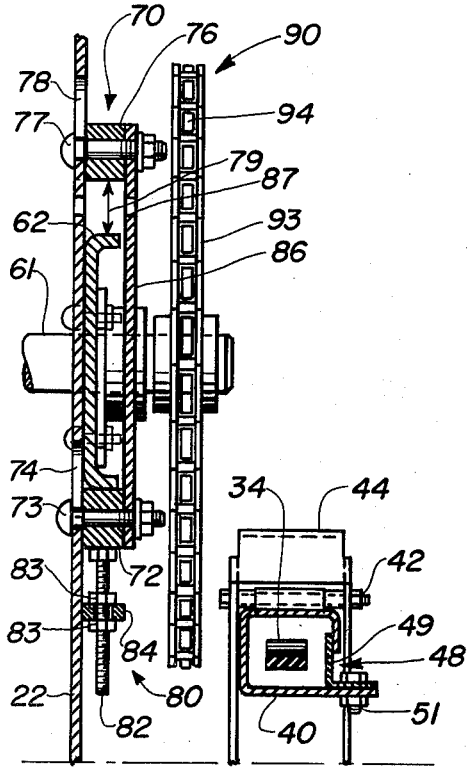
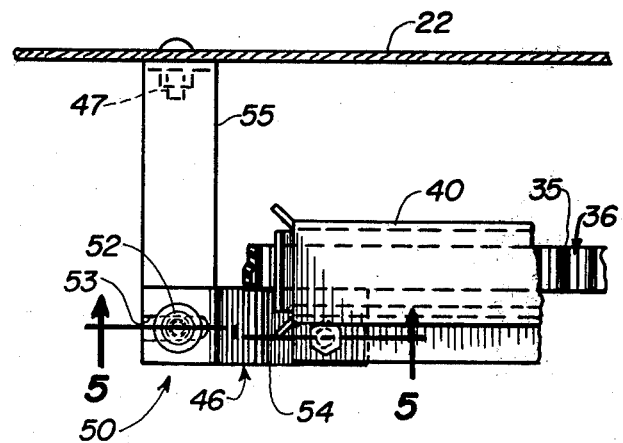
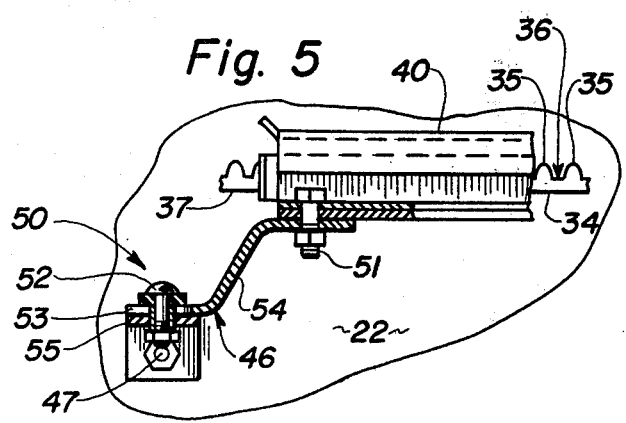

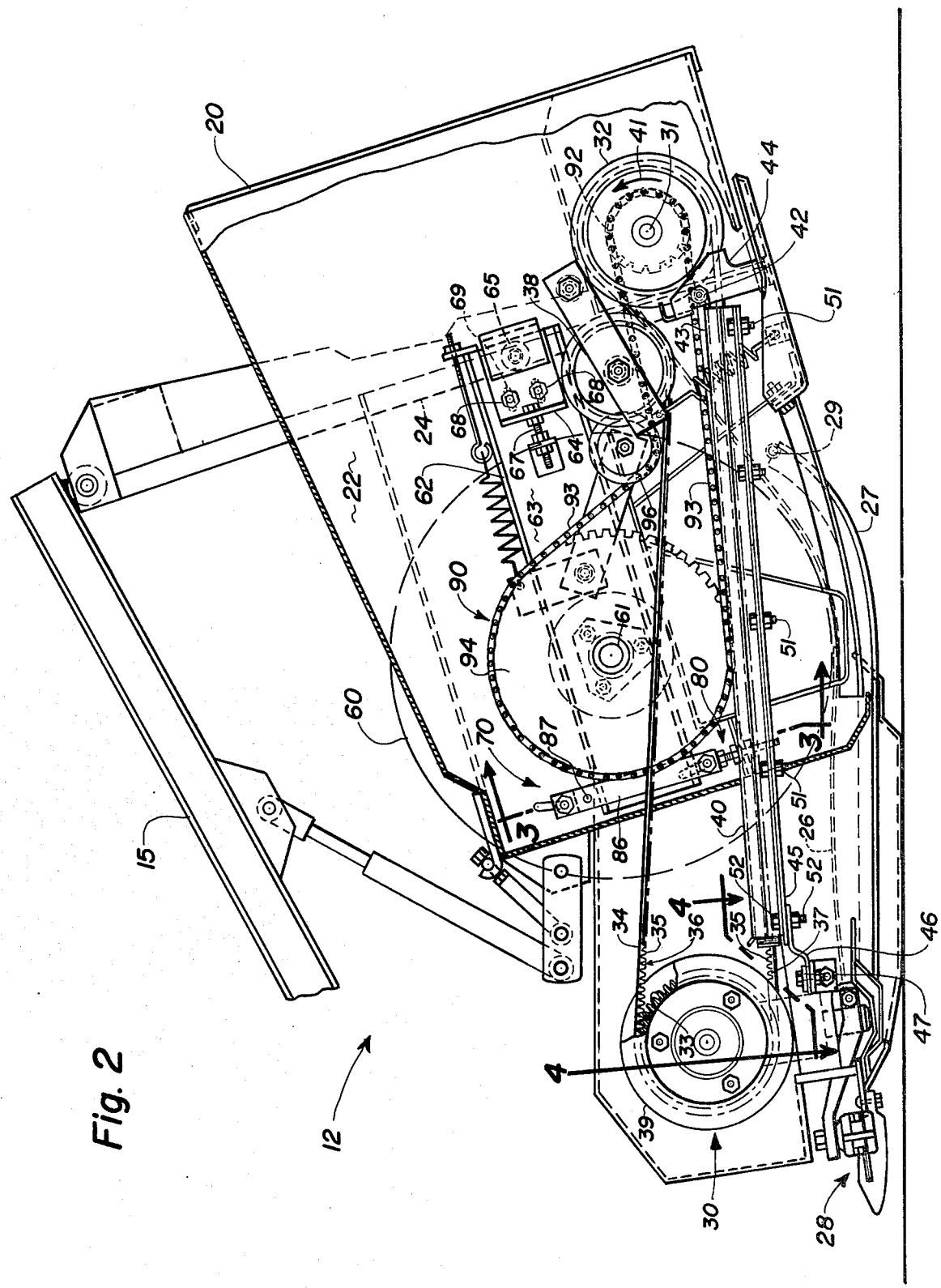

AUGER FLOATATION LIMIT

BACKGROUND OF THE INVENTION

The present invention relates generally to crop harvesting machines and, more particularly, to a flotation limit and an adjusting mechanism for use in conjunction with a floating auger.

Generally, crop harvesting machines include an auger extending transversely between opposing side sheets of the header to consolidate severed crop material and discharge it rearwardly through a centrally located opening for further harvesting treatment. Most commonly, these augers are positioned in a fixed relationship to not only the floor of the header but also the rear wall.

It has been found that it is desirable to provide a "floating" auger, i.e. one that is free to move generally vertically with respect to the floor member, so as to be more efficient in handling slugs of severed crop material entering the area of operation of the auger. One such floating auger can be found in U.S. Pat. No. 3,324,639 (Halls).

It has also been found that an auger can more efficiently convey different crop materials at different positional relationships between the auger and the floor. For example, heavy crop material, such as those with long straw, are better handled when the auger is spaced approximately one and a half inches above the floor. Lighter, short straw crops, such as oats, are better conveyed by the auger if the auger flighting is closer to the floor member than one half inch. While prior art floating augers generally provide for an adjusting means to selectively position the lower limit of the flotation movement of the auger, thereby positioning the minimum distance between the auger and the floor, such adjustments affect the amount of flotational movement permitted to the floating auger.

It has further been determined that it is desirable to be able to provide a fore-and-aft adjustment means for a floating auger, particularly during the manufacturing process, to more exactly align the auger between opposing bearing mountings. Such adjustment capabilities would also be advantageous if the operator has need to realign the auger due to prior damage or merely to resposition the auger relative to the rear wall.

SUMMARY OF THE INVENTION

It is an object of this invention to overcome the aforementioned disadvantages of the prior art by providing a flotation limit and an adjusting mechanism for a floating auger that permits vertical and fore-and-aft adjustment without effecting the amount of flotational movement permitted to the auger.

It is another object of this invention to provide a strap mechanism to interconnect the upper and lower stops on an auger flotation limit so that adjustment of one stop will effect a corresponding movement in the other stop and, thereby, allow the amount of flotational movement permitted to the auger to remian unaffected.

It is still another object of this invention to provide a fore-and-aft adjustment mechanism for a floating auger which is easily adjustable to align the auger between opposed bearings.

It is a further object of this invention to provide a support arm of two piece construction which provides pivotal movement for auger flotation and a capability of fore-and-aft adjustment between corresponding pieces.

It is a further object of this invention to provide a mechanism for optionally selecting a fixed auger or a floating auger with a preselected amount of "float".

It is a still further object of this invention to provide an auger flotation limit and an adjusting mechanism which is durable in construction, inexpensive in manufacture, facile in assemblage, carefree of maintenance, and simple and effective in use.

These and other objects are accomplished according to the instant invention by providing an auger flotation limit for a crop harvesting header on which a floating auger is utilized wherein a lower stop, defining the lower limit of movement of the auger, is connected to the upper stop, defining the upper limit of auger movement, by a strap mechanism. An adjusting mechanism operatively engages the lower stop for selectively adjusting the positional relationship between the auger and the floor of the header. The strap mechanism interconnecting the upper and lower stops permit the lower stop to be selectively adjusted without affecting the amount of flotational movement permitted to the auger. A fore-and-aft adjustment mechanism is also provided to permit the auger to be selectively adjusted in a fore-and-aft direction relative to the rear wall of the header.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a mobile crop harvesting machine, commonly referred to as a combine, incorporating the principles of the instant invention;

FIG. 2 is an enlarged side elevational view of the header seen in FIG. 1 with the reel removed for clarity;

FIG. 3 is a cross sectional view showing the auger flotation limit taken along lines 3—3 of FIG. 2;

FIG. 4 is a cross sectional view showing the top of the drive belt shielding adjacent the driven sprocket of the cutterbar drive taken along lines 4—4 of FIG. 2; and FIG. 5 is a cross sectional view showing the mounting of the drive belt shielding adjacent the driven sprocket of the cutterbar drive taken along lines 5—5 of FIG. 4.

DETAILED DESCRIPTION OF THE PREFERRED EMBODIMENT

Referring now to the drawings and, particularly to FIG. 1, a side elevational view of the crop harvesting header attached to the front of a mobile crop harvesting machine can be seen. Left and right references are used as a matter of convenience and are determined by standing at the rear of the machine facing the forward end, the direction of travel. The header 12 is mounted to the forward end of the mobile crop harvesting machine 10 to sever standing crop material and convey it rearwardly through the feeder housing 13 for further harvesting treatment. A reel 14 mounted on reel arms 15 sweeps standing crop material rearwardly over the cutterbar 28, which severs the standing crop, and conveys severed standing crop rearwardly toward the auger 60, which in turn consolidates the crop for discharge through a centrally located opening (not shown) corresponding to the feeder house 13.

Referring now to FIG. 2, an enlarged side elevational view of the header depicting the details of the instant invention can be seen. The header frame 20 supports opposing side sheets 22 positioned in a generally vertical direction parallel to the direction of travel of the mobile crop harvesting machine 10. A rear wall 24 in which the discharge opening (not shown) is located defines the rear of the header 12 between opposing side sheets 22. A floor member 26 positioned substantially horizontally adjacent the ground also extends between opposing sidewalls 22. The header 12 depicted in FIG. 2 is commonly referred to as a flexible header, since a plurality of spaced apart support ribs 27 supporting the cutterbar 28 is pivotally mounted on the frame 20 by pivot 29 such that the cutterbar 28 is free to flex along its transverse length and, therefore, more closely follow the contours of the ground.

Cutterbar Drive Shielding

The drive to the cutterbar is provided by the drive means 30 positioned adjacent each opposing side sheet 22. A drive sprocket 32 is affixed to a power input shaft 31 and transfers rotational power to a driven sprocket 39 through a drive belt 34. For headers 12 utilizing a split sickle cutterbar 28, as more particularly described in U.S. Pat. No. 3,577,716, it is of primary importance that the opposing sickle bars be maintained in proper timing relative to one another to minimize header vibration.

Accordingly, it is of importance to provide a positive means for maintaining this timing. This positive mechanism can be accomplished by providing a drive belt 34 having a plurality of teeth 35 formed into one side thereof with interstitial spaces 36 between adjacent belt teeth 35. These belt teeth 35 are engageable with corresponding indentations 33 spaced around the perimeter of both the drive sprocket 32 and the driven sprocket 39. The positive gripping action between the belt teeth 35 and the sprocket indentations 33 provides the positive driving action to maintain proper timing.

On the return run 37 of the drive belt 34 between the driven sprocket 39 and the drive sprocket 32, the teeth 35 project in an upward direction. The working environment of the crop harvesting machine 10 is such that the return run 37 is subject to having the interstitial spaces 36 filled with dirt and/or debris falling downwardly thereon. If the interstitial spaces 36 become filled with dirt and/or debris, the teeth 35 cannot positively engage with the corresponding indentations 33. The result is that the positive driving action is lost and proper timing between opposing sickles becomes disrupted. To eliminate this problem a drive belt shielding 40 is provided to prevent dirt and/or debris from falling on the return run 37 of the drive belt 34.

Because the driven sprocket 39 is mounted so as to flex with the cutterbar 28, the driven sprocket 39 is movable in a generally vertical direction relative to the drive sprocket 32. Proper tension is maintained in drive belt 34 by a spring loaded tensioning sprocket 38. The drive belt shielding 40 is mounted to move corresponding to the movements of the driven sprocket 39. The shielding 40 is pivotally attached at its rearward end 43 to a vertical shield member 44 by a pivot 42. The vertical shield 44 cooperates with the rearward end 43 of the shield 40 to prevent dirt and/or debris from being drawn into the drive sprocket 32, due to the rotation thereof in the direction indicated by the arrow 41, and is fixedly mounted to the side sheet 22. The forward end 45 of the shielding 40 is mounted through bracket 46 and connecting bolt 47 with the drive means 30 for vertical movement with the cutterbar 28 and driven sprocket 39.

As can be seen in FIGS. 4 and 5, to compensate for the changes in length between the driven sprocket 39 and the drive sprocket 32 due to the vertical movement of the driven sprocket 39, the elongated forward end 45 of the shielding 40 includes a sliding means 50. More specifically, the mounting bracket 46 includes a first leg 54 attached to the forward end 45 of the shielding 40 and a second leg 55 attached to the side sheet 22. The first leg 54 is slidably connected to the second leg 55 by a connecting bolt 52 positioned within a slotted opening 53 in the first leg 54 so that the forward end 45 can move toward or away from the driven sprocket 39. To facilitate the sliding movement between the first leg 54 and the second leg 55, a washer 56 and a spacer 57 are provided with the connecting bolt 52. One skilled in the art should realize that a telescoping mechanism built into the shielding 40 would also function as a sliding means 50 to compensate for the changes in length between the drive sprocket 39 and the driven sprocket 32.

Referring now to FIGS. 2, 3 and 4, it can be seen that the cross sectional configuration of the shielding 44 is generally tube-like such that it substantially encircles the drive belt 34. This configuration prevents contamination of the drive belt 34 by dirt and/or debris coming from below the shielding 40. To insert or remove the drive belt 34 from within the shielding 40, an L-shaped member 49 closes off a gap 48 through which the drive belt 34 may pass. The L-shaped member 49 is detachably affixed to the shielding 40 by connecting bolts 51 to provide readily accessible service to the drive belt 34. One skilled in the art should realize that the forward end 45 of the shielding 40 can be spaced somewhat from the driven sprocket 39 due to the rotation of the drive means 30 indicated by the arrow 41 tending to prevent dirt and/or debris from accumulating adjacent the driven sprocket 39.

Auger Flotation

The auger 60 is operable to consolidate severed crop material delivered rearwardly thereto by the reel 14 for discharge through the crop discharge opening (not shown) in the rear wall 24 of the header 12 to the feeder house 13 for further harvesting treatment by the mobile crop harvesting machine 10. As is seen in FIGS. 2 and 3, the auger 60 includes a shaft 61 rotatably mounted in support arm 62 adjacent each opposing side sheet 22. The support arm 62 is of a two piece construction including a forward member 63 and a mounting bracket 64.

The forward member 63 is selectively slidably affixed to the mounting bracket 64 by connecting bolts 68 fitted through slotted holes 69 in the forward member 63. A draw bolt 67 interconnecting the forward member 63 and the mounting bracket 64 serves as an adjusting mechanism to selectively move the forward member 63 in a fore-and-aft direction and, thereby, adjust the position of the auger 60 relative to the rear wall 24. Since the support arm 62 is pivotally mounted on the frame 20 by a pivot 65 connected to the mounting bracket 64, the auger 60 is capable of generally vertical movement relative to the floor member 26. This vertical movement of the auger is generally referred to as "float". To limit the amount of vertical movement permitted to the auger 60, a limit means 70 is provided.

A first, lower stop 72 is connected to the side sheet 22 by the connecting bolt 73 through a slotted hole 74 below the forward member 63 of the support arm 62. The position of the lower stop 72 determines the lower limit of vertical movement of the support arm 62 and, therefore, the auger 60. During normal operation, the forward end 63 of the support arm 62 will rest on the lower stop 72. A second, upper stop 76 is affixed to the side sheet 22 by a connecting bolt 77 extending through a slotted hole 78 above the forward end 63 of the support arm 62. The distance indicated by the arrow 79 between the forward end 63 of the support arm 62 and the upper stop 76 is the amount of flotational movement permitted to the auger 60 since the upper stop 76 defines the upper limit of movement of the support arm 62.

To selectively position the lower stop 72 and, thereby, fix the minimum distance between the auger 60 and floor member 26, a vertical adjusting means 80 is provided. As is seen in FIG. 3, the adjusting means 80 includes a bolt 82 extending through a horizontal extension 84 of the side sheet 22 which can be locked into a selected position by nuts 83 engaged with the bolt 82 on either side of the extension 84. Manipulation of the nuts 83 and the bolt 82 will vertically position the stop 72 within the limits defined by the slot shaped hole 74. A strap member 86, interconnecting the lower stop 72 and the upper stop 76, transfers vertical movement asserted against the lower stop 72 to the upper stop 76 so that the upper stop 76 moves the same distance as the lower stop 72. Accordingly, manipulation of the adjusting means 80 to vary the minimum distance between the auger 60 and the floor member 26, will not effect the amount of flotational movement 79 permitted to the auger 60; therefore, the capability of the auger 60 to smooth out slugs of severed crop material is not affected by a lessening of the amount of "float". By providing a plurality of holes 87 in the strap member 86, the amount of flotational movement 79 is permitted to the auger 60 can be selectively varied. By positioning the upper stop 76 directly adjacent the support arm 62 at the same time the lower stop 72 is adjacent the support arm 62, the floating auger can be optionally converted into a rigid, fixed auger that can still be adjusted relative to crop conditions.

As can be seen in FIGS. 2 and 3, the auger 60 is driven through an auger drive means 90 having a drive sprocket 92 affixed to the power input shaft 31 concentric with the drive sprocket 32, that transfers rotational power via a drive chain 93 to a driven sprocket 94 affixed to the auger shaft 61. To accommodate changes in distance between the auger shaft 61 and the power input shaft 31 during flotational movement of the auger 60, a spring loaded tensioning sprocket 96 is provided to maintain the proper tension in the chain 93.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiment of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a crop harvesting header attachable to a mobile crop harvesting machine to initiate the crop harvesting process, said header having a frame; opposing first and second side sheets supported by said frame, said side sheets being generally vertically inclined and positioned substantially parallel to the direction of travel of said crop harvesting machine; a floor member extending between said side sheets substantially perpendicular thereto, said floor member having a forward edge; a substantially vertical rear wall connected to said floor member rearwardly of said forward edge and extending between said side sheets generally transverse to said forward direction of travel; said rear wall having an opening therethrough for the passage of crop material to said crop harvesting machine; a crop cutting means supported by said frame adjacent said forward edge of said floor member for the severing of standing crop material; crop conveying means mounted on said frame for the movement of severed crop material rearwardly over said floor member; a crop consolidating auger mounted between said side sheets rearwardly of said crop cutting means and forwardly of said rear wall to consolidate severed crop material and discharge rearwardly through said opening in said rear wall towards said crop harvesting machine; an elongated support arm pivotally mounted on said frame adjacent each said side sheet, said auger being rotatably mounted to said support arm at a center of rotation spaced from said pivot such that said auger can generally vertically float relative to said floor member; limit means cooperable with each said support arm for limiting the amount of movement of said auger relative to said floor member; and drive means for operatively powering said cutting means, said conveying means and said auger, an improved limit means comprising:
  a first stop selectively movably affixed to the respective said side sheet below said support arm to provide a lower limit for the movement of said auger;
  a second stop selectively movably affixed to said respective side sheet above said support arm to provide an upper limit for the movement of said auger;
  a vertical adjusting means for selectively moving said first stop in a generally vertical direction so as to position said lower limit of movement of said auger at a desired location relative to said floor member; and
  a strap mechanism interconnecting said first and second stops and including a locking means cooperable therewith to selectively lock said first and second stop in a selective position relative to said side sheet, said strap mechanism simultaneously providing equal movement of both said first and second stops such that the amount of flotational movement permitted to said auger does not vary when said vertical adjusting means is manipulated to change the lower limit of movement of said auger.

2. The crop harvesting header of claim 1 wherein said second stop is selectively movable relative to said first stop along said strap mechanism to pre-selectively vary the amount of flotational movement permitted to said auger.

3. The crop harvesting header of claim 2 wherein said second stop is positionable to prevent any flotational movement to be permitted to said auger such that said limit means is operable to selectively convert said auger from a floating auger capable of flotational movement relative to said floor member to a rigid auger which has a fixed positional relationship to said floor member.

4. The crop harvesting header of claim 2 wherein said support arm includes a mounting bracket pivotally affixed to said frame, an elongate member rotatably connected to said auger and a fore-and-aft adjustment means for the connection of said elongate member to said mounting bracket for selective fore-and-aft movement relative thereto such that said auger may be selectively positioned relative to said rear wall.

5. The crop harvesting header of claim 4 wherein said vertical adjusting means includes a draw bolt, each respective said side sheet having a horizontal member with an opening therethrough, said draw bolt being positioned vertically through the hole in said horizontal member with a nut being engaged with said draw bolt on either side of said horizontal member to lock said draw bolt into a pre-selected position, said draw bolt being engaged with said first stop, said first and second stops including bolts extending through slot shaped holes in said side sheet and having nuts engageable therewith to lock said first and second stops in a pre-selected position relative to said side sheet, said slot shaped holes permitting said first and second stops to move generally vertically relative to said side sheets.

6. The crop harvesting header of claim 5 wherein said fore-and-aft adjustment means includes a draw bolt cooperatively engaged with said elongate member and said mounting bracket to selectively move said elongate member in a fore-and-aft direction relative to said mounting bracket.

* * * * *